United States Patent [19]

Entner et al.

[11] Patent Number: 5,282,181
[45] Date of Patent: Jan. 25, 1994

[54] SILENT ALARM TIMEPIECE

[75] Inventors: Shelly K. Entner, 4190 N. 42nd Ave., Hollywood, Fla. 33021; Philip R. Lichtman, Newton, Mass.; David B. Gernes, Watertown, Mass.; Ernesto E. Blanco, Belmont, Mass.

[73] Assignee: Shelly Karen Entner, Hollywood, Fla.

[21] Appl. No.: 749,206

[22] Filed: Aug. 23, 1991

[51] Int. Cl.$^5$ .............. G04B 23/02; G04B 19/06; G04C 21/00
[52] U.S. Cl. ........................... 368/73; 368/230; 368/250
[58] Field of Search .................. 368/72–74, 368/230, 246, 250, 255; 340/407

[56] References Cited

U.S. PATENT DOCUMENTS

| | | | |
|---|---|---|---|
| 4,297,677 | 10/1981 | Lewis et al. | 340/556 |
| 4,456,387 | 6/1984 | Igarashi | 368/230 |
| 4,472,065 | 9/1984 | Goodman | 368/71 |
| 4,637,732 | 1/1987 | Jones et al. | 368/109 |
| 4,920,525 | 4/1990 | Meister | 368/250 |
| 5,023,853 | 6/1991 | Kawata et al. | 368/230 |

FOREIGN PATENT DOCUMENTS 711170  7/1966  Italy ............................ 368/230

*Primary Examiner*—Vit W. Miska
*Attorney, Agent, or Firm*—Pandiscio & Pandiscio

[57] ABSTRACT

A timepiece to be worn on the person which provides a silent mechanism alarm in the form of a tactile stimulus to the wearer when the chosen alarm time is reached. The tactile stimulus is provided by a motor attached to or integral with the timepiece and which may be driven by the same battery. The motor may actuate an element which creates the tactile stimulus in the form of vibrations, oscillations, a thumping sensation or a tightening of the wristband, among others.

9 Claims, 8 Drawing Sheets

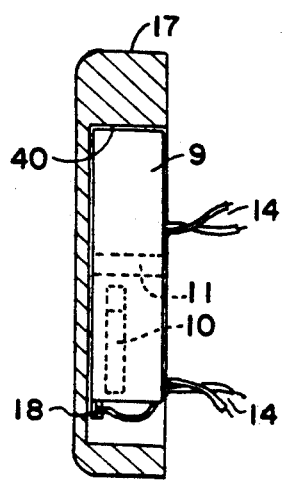
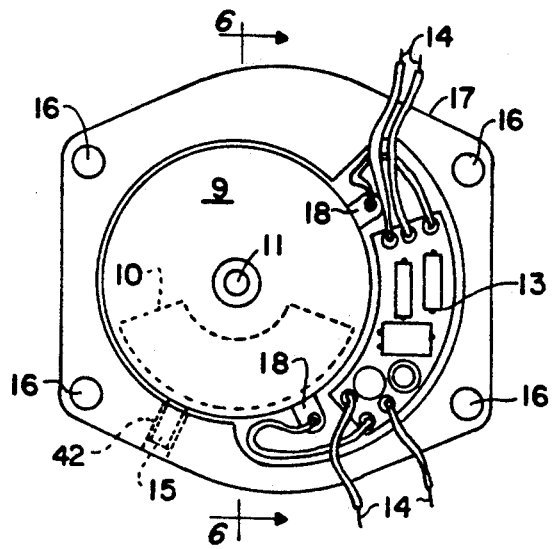
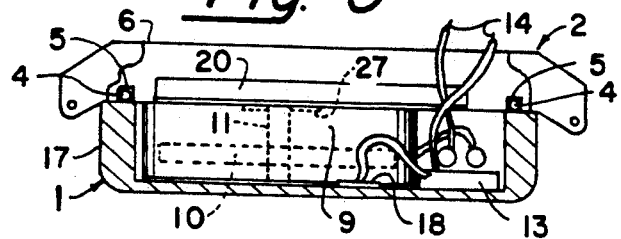
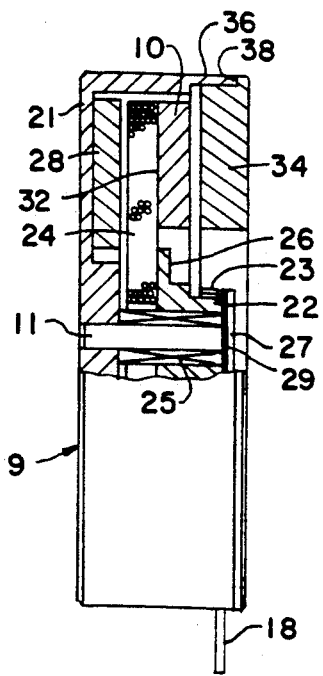
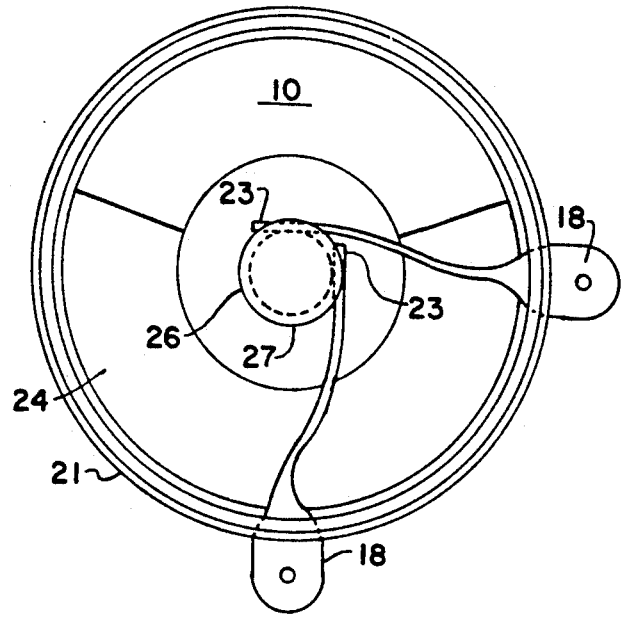
Fig. 6
Fig. 5
Fig. 7
Fig. 8
Fig. 9

SILENT ALARM TIMEPIECE

FIELD OF INVENTION

This invention relates to an apparatus for alerting a sleeping or awake person noiselessly at a given time, and more particularly, to a timepiece such as a wristwatch which, at a selectable time, provides a tactile stimulus to attract the wearer's immediate attention without disturbing other persons.

BACKGROUND OF THE INVENTION

Alarm devices intended to awaken sleeping persons, or to elicit the attention of awake persons, usually emit audible signals which can be distracting to others in the vicinity and embarrassing to the operator. In the case of the deaf, auditory signals are completely ineffective. While patents have been issued for devices intended to awaken deaf persons, these devices are relatively bulky, complex, or unsuited for wearing comfortably on the person. For example, as described in U.S. Pat. No. 2,517,368 issued to Wiseley on Aug. 1, 1950, clocks with time controlled alarm mechanisms have been proposed which are connected to the speaker coil of a hearing aid to impress sounds on the auditory organ. More recently, as shown in U.S. Pat. No. 4,821,247 issued to Grooms on Apr. 11, 1989, alarm clocks have been built in the form of in-the-ear insertable or on-the-ear wearable alarm devices. Clearly, such devices are bulky and uncomfortable to a user, and may fall out of the ear during the time a person is asleep, thus becoming useless.

Another approach that has been proposed is a device such as shown in U.S. Pat. No. 4,028,882 and U.S. Pat. No. 4,093,944 issued on Jun. 14, 1977 and Jun. 6, 1978, respectively, to Muncheryan, which couple an electric timer unit to a pulsative resonator unit which may be positioned under a sleeper's pillow. When activated, the resonator unit produces vibratory pulses adjacent a person's head. Such devices cannot be worn and are not portable, and thus not usable by individuals needing to be awakened or alerted when not in their home environment. Still another approach is shown in U.S. Pat. No. 2,580,598 issued to Rody on Jan. 1, 1952 wherein an electric clock is connected to a vibrator mounted on the frame of a bed so that vibrations are imparted to the sleeper in a bed.

Finally, as shown in U.S. Pat. No. 1,322,500 issued to Gill on Nov. 18, 1919, a wristwatch having a clock or spring driven gear train is provided with one or more hammerheads, which are driven to impart a hammer alarm to the wearer upon a time signal. Such a device is clearly very cumbersome and awkward.

Such prior art fails to make use of high energy density electrical batteries and high efficiency rare earth permanent magnet motors, among other advances, and consequently prior alarm devices are not satisfactory for everyday use when comfortably worn on the person.

OBJECTS OF THE INVENTION

It is therefore desirable to provide a wearable alarm watch which enables a deaf person to enjoy the benefits of an alarm watch, previously denied him. The present invention has as its primary object the provision of a relatively small, light, comfortable, self-contained timepiece that can be worn on the person (as, for example, a wristwatch, pocket watch, belt watch, anklet, or pendant) and which can be set to alert the wearer at a selectable time by means of a tactile sensation. Such tactile sensation may be supplemented by additional signals such as a conventional auditory tone or a visual stimulus (for example, a flashing light). Thus, a sleeping person may be awakened without disturbing a spouse; a physician can be called to his duties without disturbing his colleagues; and a businessman can be made aware of a scheduled event without disrupting a meeting.

SUMMARY OF THE INVENTION

In a preferred embodiment of the invention, a battery-powered digital alarm wristwatch is combined with an electric motor and suitable driven components so that, at the pre-set alarm time, the motor commences to operate, initiating a shaking, vibratory, or other tactile stimulus that alerts the wearer.

The tactile stimulus is preferably obtained from the rotary action of a motor shaft by connecting an operative means such as an off-center weight, or eccentric, or a plate carrying centrifugally actuated arms to the motor shaft so as to induce an imbalance condition, resulting in a vigorous shake (at low motor speeds) or vibration (at high motor speeds) to the watch, or by delivering a series of sideways blows to the alarm housing. Another tactile stimulus may be in the form of imposing movement upon a membrane which forms the back cover of the alarm housing which bears against a wearer's skin. A still further tactile stimulus employed in the invention includes a plunger element which delivers a blow to the wearer's arm by slightly indenting the skin. Such a device also causes tightening of the watchband, which sensation may also alone be sufficient to alert the wearer.

BRIEF DESCRIPTION OF THE DRAWINGS

These and other advantages will become more readily apparent upon a reading of the detailed description following hereafter and upon an examination of the drawings, in which:

FIG. 5 is a plan view of the motor, motor housing and motor operating circuit used in combination with a digital watch, taken along line 5—5 of FIG. 1, shown partially in phantom and with the strap and portions of the casing removed for the sake of clarity;

FIG. 6 is a transverse cross-sectional view taken along line 6—6 of FIG. 5 showing the motor's position in its housing;

FIG. 7 is a longitudinal cross-sectional view of the motor in its housing, with details of the digital watch assembly and strap removed, taken along line 7—7 of FIG. 2;

FIG. 8 is an enlarged side view, partially in cross-section, of the motor in the preferred embodiment of the invention;

FIG. 9 is an enlarged top view of the motor shown in FIG. 8 with the cover plate removed, but with the brushes in place (which otherwise would normally be connected to the cover plate);

DETAILED DESCRIPTION OF THE INVENTION

Figure 1:
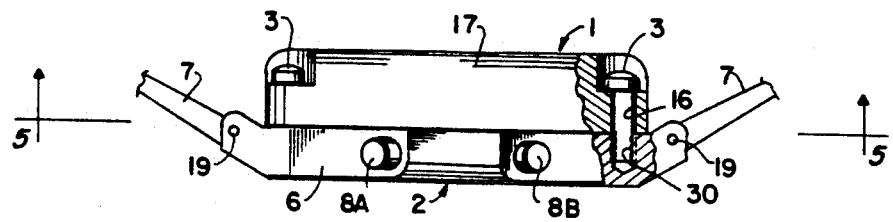
FIG. 1 is a side view of the exterior of a preferred embodiment of the timekeeping device of the invention taken along a plane perpendicular to the length of the watch strap.
Figure 3:
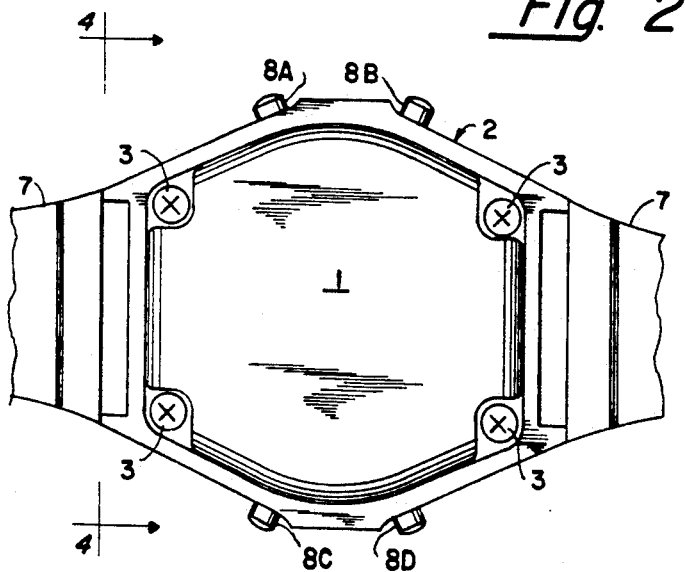
FIG. 3 is a bottom view of the exterior of the embodiment of the invention shown in FIGS. 1 and 2.
Figure 4:
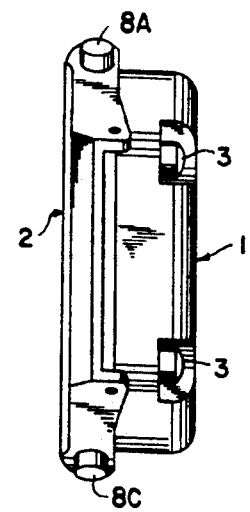
FIG. 4 is an end view of the exterior of the preferred embodiment of the invention shown in FIG. 3, with the strap omitted for the sake of clarity.

As shown in FIGS. 1, 3 and 4, the apparatus of the invention consists of two major components: a timepiece or timekeeping device 2 in the form of a wristwatch, and an alarm mechanism 1. Although these major components could be made as a single assembly, it is preferable to arrange them for convenient separation to facilitate battery replacement. Timepiece 2 and mechanism 1 are secured together by screws 3, which pass through clearance holes 16 in alarm mechanism housing 17 and are threaded into corresponding threaded holes 30 in watch casing 6 of timepiece 2.

Battery 20, shown in FIG. 7, powers motor 9 as well as timepiece 2, although several batteries may be used either to power the motor and timepiece together, or separately. Battery 20 is shown as being located inside timepiece 2, although it can also be located in the alarm mechanism housing 17.

In FIGS. 5-7, protruding wires are shown as they might appear prior to connecting them with the wristwatch assembly, although in practice, electrical connections between the watch assembly and the motor housing might best be effected by springy metal tabs integral with the digital watch assembly back structure as is common in the watch art. These tabs would contact electrically conductive rigid pads in the motor housing.

Figure 2:
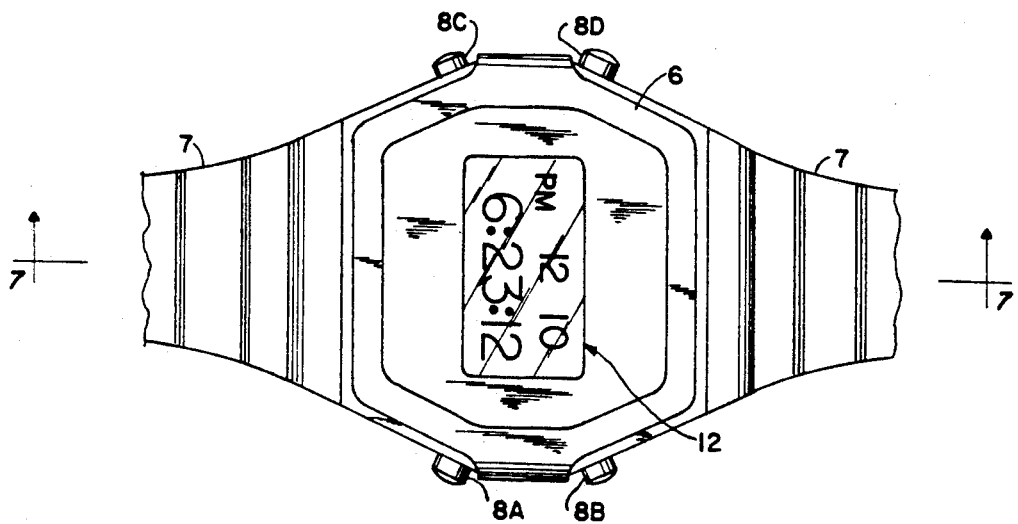
FIG. 2 is a top view of the exterior of the embodiment of the invention shown in FIG. 1.

Timepiece 2 is illustrated in FIG. 2 as having a time-date-data display 12, function push-buttons 8A, 8B, 8C and 8D, a watch casing 6, and a strap 7 held by attachment pins 19, (see FIG. 1) as is typical in commercial digital alarm watches. Alarm mechanism housing 17 can be mated to existing wristwatches by suitably configuring its shape, and locating it appropriately through holes 16.

As shown in FIG. 8, motor housing 21 is generally flat and "cup-like" in cross-section. Motor 9 is of the so-called "pancake" design, minimizing its axial thickness. Pancake motors are widely used as fan motors and thus are well known in the art. A weight 10 is affixed as by cement to the armature, as for example to the armature coils 24 of motor 9, as shown at 32 in FIG. 8. Alternatively, a weight can be externally mounted on an extension of motor shaft 11 to rotate with respect thereto, in which case bearings would be provided. Motor 9 may be mechanically commutated (as shown) or electronically commutated. In the latter instance, a rotating permanent magnet might constitute the field, and in such a case the magnet might be located off-center so that it serves the additional function of eccentric weight 10. In this way, the thickness of motor 9 can be diminished still further.

Shaft 11 of motor 9, as seen in FIG. 8, is tightly fitted centrally into motor housing 21 and acts as a cantilevered internal extension of motor housing 21. Armature 26, consisting of a plurality of coils 24 and a commutator assembly 22, rotates freely on shaft 11, being constrained axially by a head 27 on shaft 11. Insulating means such as a washer 29 would be provided beneath the head 27. A low-friction bearing 25 is pressed tightly into armature 26 and is sized to run smoothly and freely on stationary shaft 11. Bearing 25 is preferably a rolling contact anti-friction bearing, or a sleeve bearing, of a material such as TEFLON ®, for reasons of silence and low friction. Brushes 23 (see FIG. 9) contact commutator assembly 22 and lead to terminals 18. It should be noted that motor 9 can be made even shorter than is shown in FIG. 8 by employing a disk, rather than a drum commutator, in a manner well known in the motor art. The field of motor 9 is provided by a permanent magnet 28, preferably a rare earth magnet such as samarium-cobalt or neodymium-iron. Cover 34 is press-fitted or cemented into the outer wall portion 36 of housing 21. Cover 34 may have a lip 38 which seats on the outer edge surface of wall 36.

The advantages of this arrangement are: (1) the bearing load imposed on bearing 25 by eccentric weight 10 is directly over bearing 25, minimizing wear couples and maximizing efficiency; (2) bearing 25 is relatively long, reducing wear; (3) the need for a bearing at each end of armature assembly 26 is eliminated, conserving space; (4) assembly of motor 9 is very easy, since bearings do not have to be aligned with respect to each other; (5) silence is promoted because, absent the need for aligning two bearings, the clearance of bearing 25 can be very small; and (6) motor 9 can be extremely short in the axial direction.

Motor 9 is fitted into cavity 40 in alarm mechanism housing 17 and is secured in housing 17 by means of a setscrew 15 which is threaded into hole 42 (see FIG. 5) and bears against the outside of motor housing 21. Cavity 40 is sealed against moisture by an appropriate sealing compound or by cement, or both, which can be applied in hole 42 when screw 15 is seated. As shown in FIG. 7, an O-ring 4, located in circumferential groove 5, prevents the ingress of moisture between mechanism housing 17 and watch casing 6. O-ring 4 is situated in the groove 5 inboard of holes 16 for screws 3, and timepiece 2 is sealed with elastomeric and cement provisions, which precautions render the device waterproof.

Circuit board 13 (see FIGS. 5 and 7) and all of the wires 14 (except a pair that connects timepiece 2 to terminals 18 of motor 9) may be omitted if the apparatus constructed in accordance with the teachings of the invention incorporates a timepiece 2 whose internal circuitry is specifically designed to include the motor control circuits 56 described hereafter, as well as the normal watch circuit. It is intended that in full production the invention will be carried out with a single circuit incorporating both the motor control circuits and the watch control circuit. However, in the event that apparatus constructed in accordance with the teachings of the invention makes use of a commercial timepiece 2, then the motor-operating circuit 56 contained on circuit board 13 (FIG. 10) is required.

Most digital alarm watches emit an auditory signal initiated by a relatively weak pulse train. The pulses are closely spaced in time over an interval of typically approximately ½ minute. By contrast, the silent alarm of the invention requires a continuous signal at full battery voltage, spanning the same interval of approximately ½ minute, in order to run motor 9. If the motor were to operate in an intermittent or start-stop mode according to the normal wristwatch alarm signal pulse train, not only would the average speed of motor 9 be low, limiting the effectiveness of the invention, but also the repeated accelerations of motor 9 would draw high currents for a significant fraction of the alarm interval, and this would soon deplete battery 20. Therefore, unless a specially designed circuit is incorporated in the watch, the discontinuous alarm signal pulse train produced by a conventional alarm wristwatch has to be converted into a continuous signal to motor 9 at full battery voltage.

Furthermore, due to the current demands of motor 9 (especially when starting up), display 12 may tend to dim when the motor is operating. Some commercial digital alarm watches, such as might be used to practice this invention, contain internal circuitry (activated by pressing the illumination push-button 8A typically used to make display 12 visible in the dark by means of the light of a small bulb) that for an interval of typically one minute intensifies display 12 so that it does not become dim when motor 9 runs. One such commercially available wrist watch is Casio Model 690-W-26B having an LCD display, whose circuitry module QW 690 may be modified and used with a circuit 56 in connection with the teachings of this invention.

Circuit board 13 is provided to contain the circuit 56 required to fulfill the needs described above when using commercially available watches to carry out the invention. In a commercially available digital watch module, such as the Casio Module QW-690, a watch circuit 44 (see FIG. 10) is provided which includes a clock chip 54 coupled to an alarm signal generating circuit which includes a choke coil L and a crystal PZ to generate an audible stimulus. The module further includes a lamp to illuminate the display and a switch SL which is the function pushbutton switch 8B shown in FIGS. 1–4. The audible stimulus means may be removed if it is desired to eliminate an audible stimulus and rely only on a tactile stimulus when carrying out the invention. In such event an alarm signal generated in circuit 44 will be transmitted over line 46 solely to the motor operating or drive-intensifier circuit 56. The circuit 56 as shown in FIG. 10 indicates specific components having values which are chosen to accommodate the Casio Module QW 690.

The circuit 56 generates two outputs when an alarm signal is received from wristwatch 2. First, an "intensify" (see "INTENS" in FIG. 10) command is generated that lasts approximately 5 milliseconds, which is immediately fed back into wristwatch 2, triggering the intensification means built into the watch circuit. Secondly, a motor drive pulse lasting at least one second is generated along line 48 which is maintained or retriggered if alarm pulses from wristwatch 2 arrive at intervals shorter than one second, and this motor drive pulse continues until the alarm pulse train from wristwatch 2 ceases, resulting in a continuous supply of electricity at full battery voltage to motor 9 as long as the alarm pulse train from wristwatch 2 continues.

Figure 10:
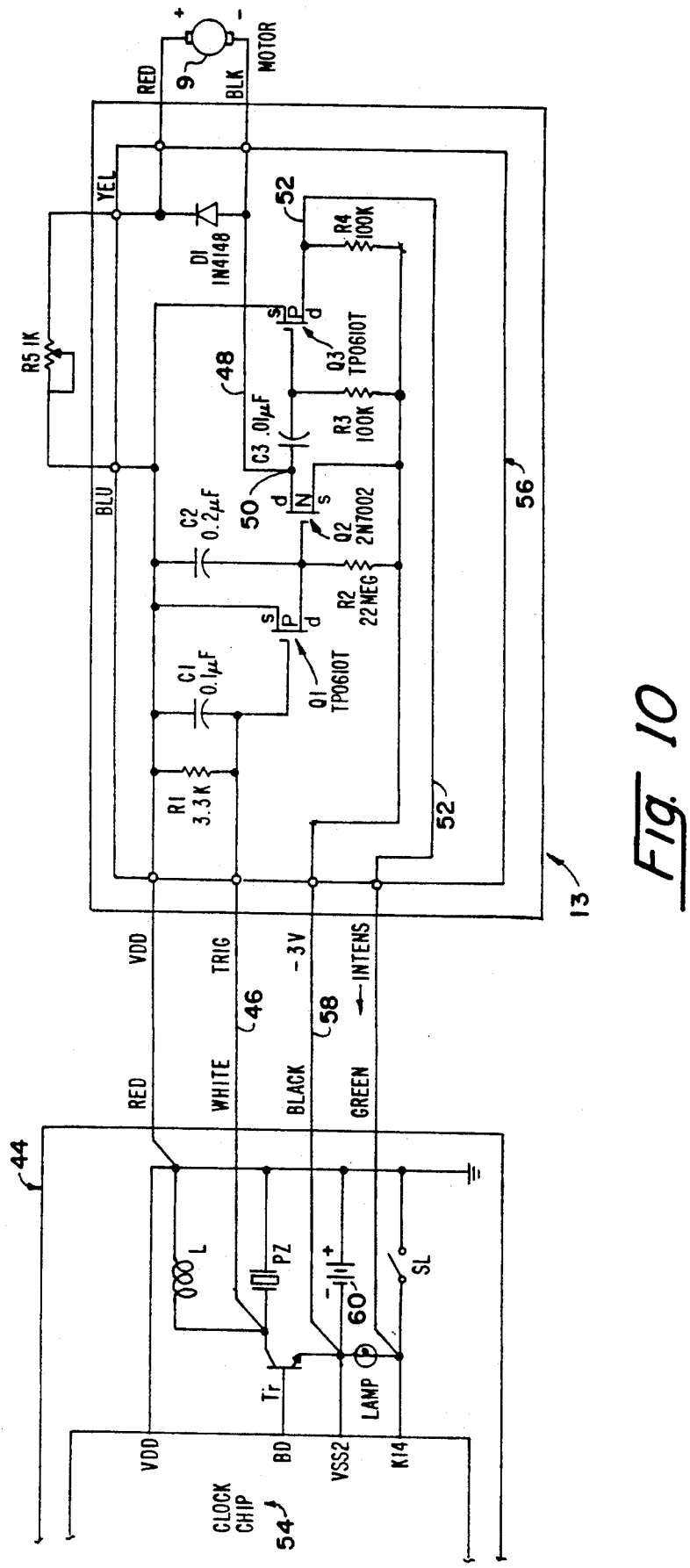
FIG. 10 is a schematic diagram of a circuit used to adapt a typical digital alarm watch to operate the motor used in the preferred embodiment of the invention.

Referring further to FIG. 10, the circuit 56 contained on circuit board 13 operates as follows. Typically the conventional watch has a circuit 44 which includes a 3-volt battery 60 and a positive-ground frame, and produces alarm pulses from ground to $-2$ volts. Alarm pulses from wristwatch 2 are transmitted over line 46 and arrive at the gate of Q1, which is a P-channel enhancement-mode field-effect transistor (FET), turning it ON and bringing the gate of transistor $Q_2$ up to ground potential. Transistor Q1 provides isolation from wristwatch 2 and "open drain" operation, permitting it to accommodate the differing alarm signals produced by a variety of timepieces 2. It also presents substantially infinite off-resistance to the following R1C1 circuit. Capacitor C1 acts in conjunction with resistor R1 as a motor noise suppressor.

Q2 is an N-channel FET and is turned ON at this time to activate motor 9 by a signal transmitted on line 48. Q2 (and motor 9) remain ON after Q1 opens, until the C2/R2 charging couple charges down to approximately 1 volt positive with respect to the negative signal on line 58. Absent a second trigger pulse from wristwatch 2, transistor Q2 will open after about one second. However, the time between successive pulses from the alarm pulse train of wristwatch 2 is significantly less than one second. Consequently, motor 9 runs continuously until approximately one second after the last pulse of the alarm signal pulse train has been received by circuit 56. D1 is a diode snubber for inductive/commutative motor voltage spikes. R5 (FIG. 10) (which is located remotely from circuit board 13, such as on motor housing 17 in such a position that it can be adjusted externally) is used to vary the speed of motor 9 to give the most effective tactile alerting stimulus. The latter will depend on the mass and construction of the device of the invention, the tightness of strap 7, the physiology and psychology of the wearer, and other factors.

When motor 9 is first activated by Q2, the falling edge at the Q2/C3 junction 50 is applied to the Q3 gate, differentiated by C3 and R3. Q3 is a P-channel FET which turns ON during this edge for a period of approximately 5 msec. Its ON time is determined by the rate-of-rise of the Q2 drain and the values chosen for the differentiator R3/C3. This pulse of approximately 5 msec. is fed back to wristwatch 2 over line 52 to activate the intensifier circuit for display 12 and activate the illumination lamp.

It should be recognized that commercial timepieces vary in design and circuitry, and different timepieces may require changes to the circuit beyond that shown in FIG. 10, although the general principles may remain the same. As indicated previously, it is preferable that in production the circuit would be built into the watch itself.

To use the silent alarm device of FIGS. 1-10 of the invention, the wearer presses at least one of the pushbuttons 8A, 8B, 8C or 8D to set the alarm time, just as in the case of a conventional alarm watch. When the designated alarm time arrives, the alarm signal (operating through internal circuits in timepiece 2 or external circuits on circuit board 13, as the case may be) causes motor 9 to start, whereupon eccentric weight 10, rotating rapidly, shakes or vibrates the device, alerting the wearer, who may then stop the motor by pressing appropriate buttons 8.

FIGS. 11-14 illustrate embodiments of the invention wherein the tactile stimulus is imparted by motions delivered through the back of the alarm housing, i.e. the surface next adjacent the arm or skin of the wearer. With respect to the embodiment shown in FIGS. 11-13 (see FIG. 11) a watch case 103 is employed which has a flexible, nonpermeable membrane 124 for the back surface of the alarm assembly 100, which is attached to the timepiece 102. For the sake of simplicity, most of the internal components of watch case 103 are not shown.

The housing 105 for the silent alarm mechanism is provided with through holes 106 in the recessed areas 107 for receiving a series of screws 108. The watch case 103 has threaded holes 104 which are aligned with the holes 106 for assembling the alarm housing 105 to the watch case 103. An electric "pancake" type motor 112 is set into a bore 113 in the alarm housing 105 and is retained therein by means of a set screw 109 that is screwed into a threaded hole 111 in housing 105. Waterproofing and sealing would be provided as described in connection with the embodiment of FIGS. 1-10. To seal the alarm housing 105 to the watch case, an O-ring 110 is provided, in the manner as previously described in connection with the embodiment of FIGS. 1-10.

The motor 112 operates an input pinion gear 130 of a gear train 114. Housing 105 provides a circular recess 115 to accommodate the intermediate gear 119 of gear train 114. A further recess 117 is provided to accommodate the annular rotary gear plate 118 which is driven by the gear train. Gear plate 118 has internal gear teeth 120 on its internal diameter to mesh with the output pinion gear 132 of the gear train. Since gear plate 118, although in mesh with gear 132, is still able to "float" axially, any tendency to do so is reduced by the provision of a bearing plate 116 (FIG. 11) which is immovably mounted on the motor housing surface. As indicated, the back surface 124 is a flexible, nonpermeable membrane which may be a thin polymeric or elastomeric sheet. This membrane 124 is retained and held in continuous contact with the internal annular rotary gear plate 118 by a plastic or elastomeric cover or ring 126.

Gear plate 118 is provided with one or more protrusions 122 on its upper surface. When gear plate 118 is caused to rotate by motor 112 driving the gear train 114, the protuberances 122 act like moving "bumps" which are felt by the wearer as traversing a circular path through the membrane 124.

Figure 11:
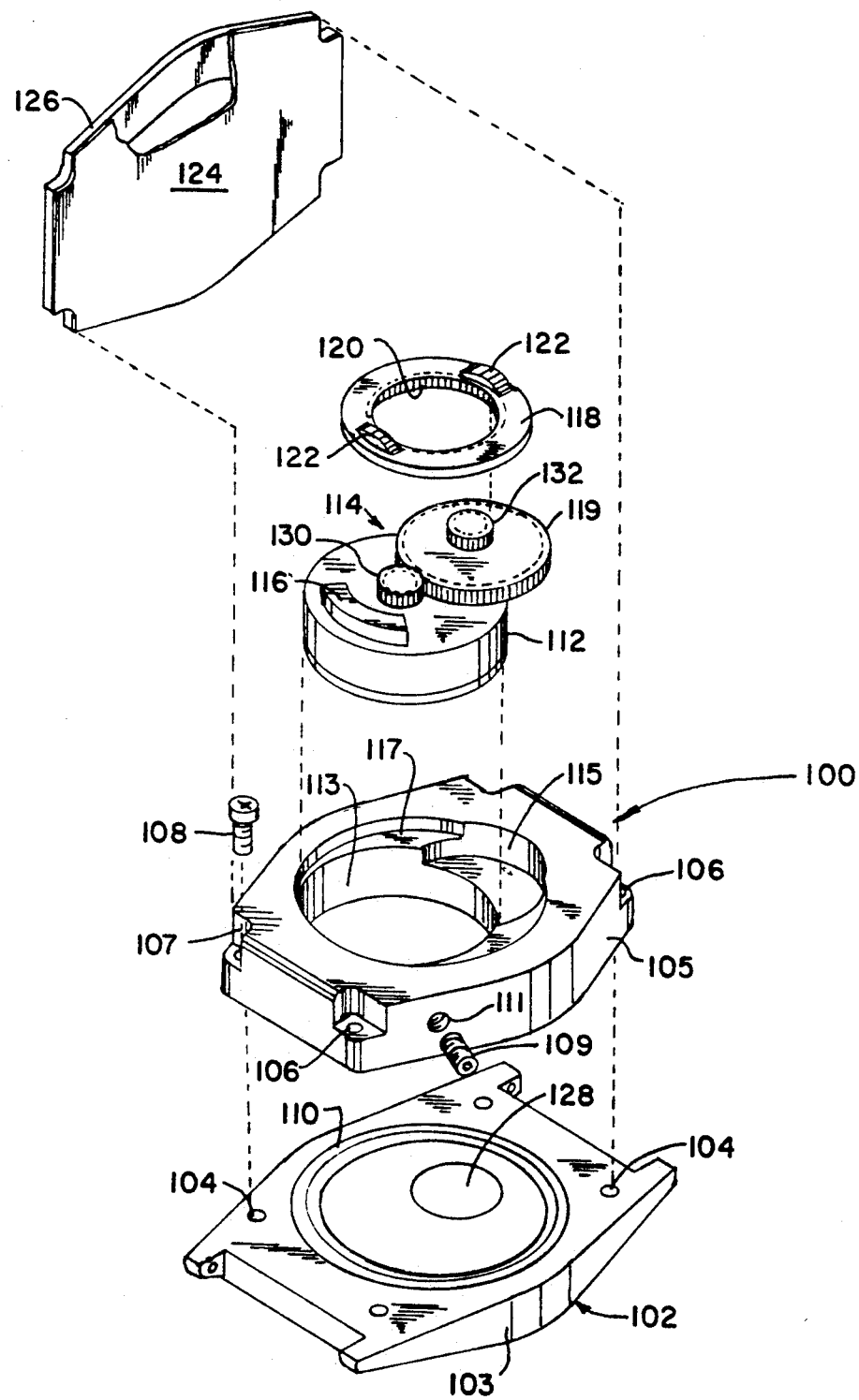
FIG. 11 is an exploded isometric view of another embodiment of the invention employing a flexible membrane back surface for the alarm mechanism.
Figure 12:
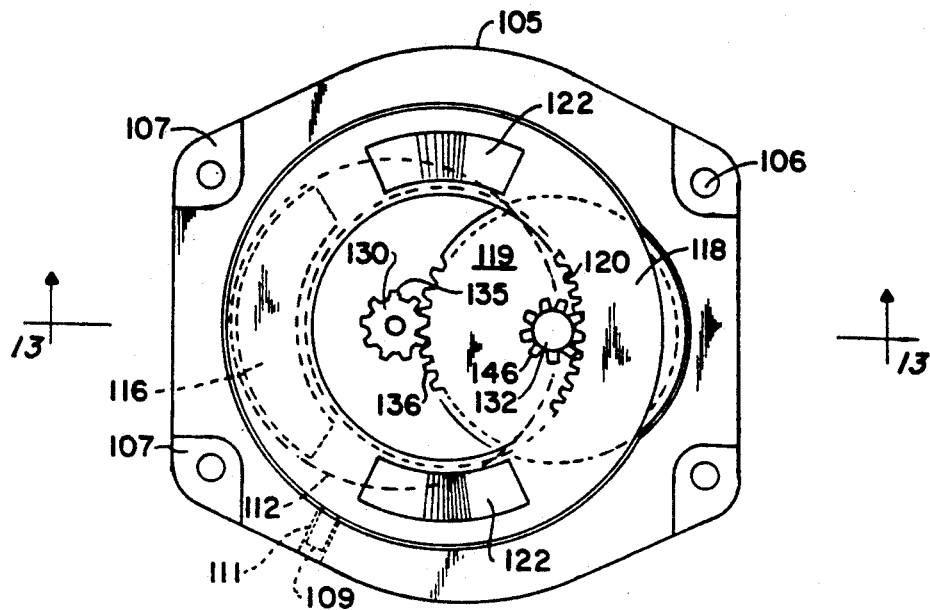
FIG. 12 is a bottom view of the combination watch-silent alarm mechanism shown in FIG. 11 with the back cover removed.
Figure 13:
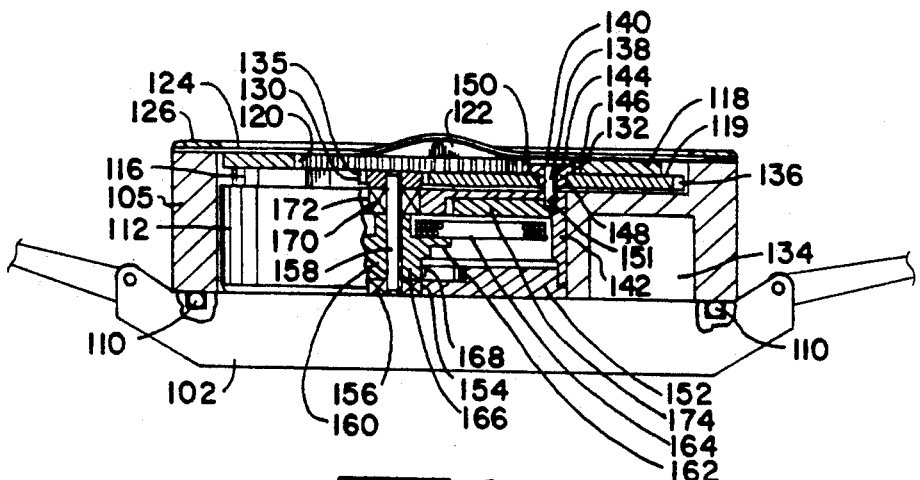
FIG. 13 is a longitudinal view taken of the embodiment of FIG. 12, partially in cross-section.

As shown in more detail in FIGS. 12 and 13, the housing 105 is provided with a cavity 134 which may accommodate the electronics for operating the motor 112. The motor shaft 158 carries the input pinion gear 130 (FIG. 11) which is press fitted onto the end thereof so that it rotates with the shaft. Teeth 135 on pinion gear 130 are in mesh with the external teeth 136 of the intermediate gear 119. A shaft 138 is press fitted into a bore 151 in the upper part of the motor housing 142. The shaft 138 is provided with a headed end 140 to retain thereon the freely rotatable gear 132. The output pinion gear 132 is provided with a bore 144 sized to permit this rotation, and is further formed with the hub 148 which fits tightly into the central hole 150 in the intermediate gear 119 so that they rotate together. The output pinion gear 132 which rotates with the intermediate gear has teeth 146 which are in mesh with the internal gear teeth 120 of plate 118. The head 140 prevents axial motion of gears 119 and 132. The pitch diameter of the internal gear formed by the teeth 120 is coaxial with the outside diameter of rotating plate 118. It is apparent that the speed of rotating plate 118 is much reduced from that of motor shaft 158 since two substantial gear reductions are interposed between input and output of the gear train 114. The gear ratio is chosen so that there is sufficient torque to rotate the plate 118 despite the frictional and other resistances that it may encounter. Various recesses are provided to confine the rotating plate against radial and axial movement. As indicated above, the periphery of the circular recess 117 in housing 105 confines the rotating plate 118 radially since there is only a small radial clearance between the two (see FIG. 13) to permit free running. The rotating plate 118 is further confined axially by the floor of recess 117 (i.e. in the direction of the motor 112) and by the membrane 124 (i.e. in the direction away from the motor). The rotating plate 118 is further restrained axially by the bearing plate 116, whose outer surface is coplanar with the floor of the circular recess 117. The several axial constraints are dimensioned so as to preclude binding of rotating parts.

As seen in FIG. 11, housing 105 is open at both ends. As described above, the upper end is closed by the membrane 125 and cover 126. The lower end is open at the cavity 134 to either receive the electronic circuit board for operating the motor and watch (in the manner of the embodiment of FIGS. 1-10) or which may contain spring contact elements to cooperate with the watch battery 128 (see FIG. 11) to provide current to the motor 112. The other opening 113 in the lower end of the housing 105 receives the motor 112.

Motor 112 comprises a substantially cylindrical housing 142 (FIG. 13) which is closed at its open end by the cover plate 152. Cover plate 152 is provided with a central hole 154 to receive a bearing 156 for the motor shaft 158. The other end of the motor shaft is provided with a bearing 170 which is placed in a hole 172 in the upper, otherwise closed, end of the housing 142. An armature 160 is mounted intermediate the two bearings 156 and 170 which rotates with the shaft 158. The armature is provided with a flange 162 which has a series of coils 164 affixed to it. The armature assembly further includes a commutator section 166 to coact with the commutating brushes, such as brush 168, for purposes of motor operation. A permanent magnet 174 may be employed as the field in the manner as shown in FIG. 8. Also, electronic commutation is possible, as discussed in connection with the description of the embodiment shown in FIG. 8.

The physiological sensation produced by operation of the embodiment of FIGS. 11-13 is a circular tracing sensation. This may be supplemented by a tugging of the watch band due to the rocking motion resulting from the circumferential motion of the protuberances 122 on the plate 118, which may be made more pronounced if only one such bump is used.

Figure 14:
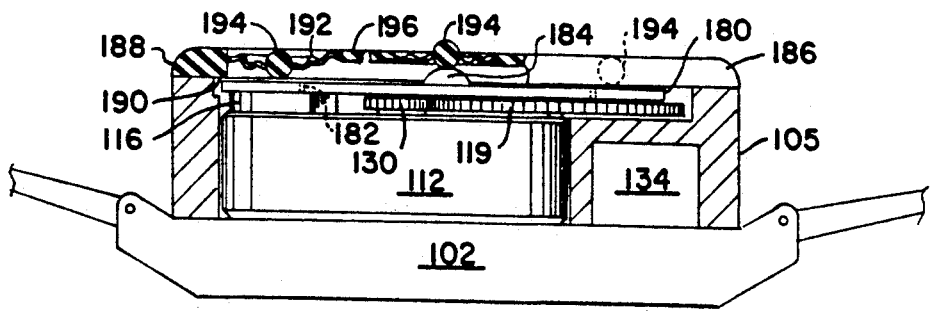
FIG. 14 is a longitudinal view, partially in cross-section, taken of a further embodiment of the invention similar to that shown in FIG. 11, but with a different form of flexible membrane.
Figure 15:
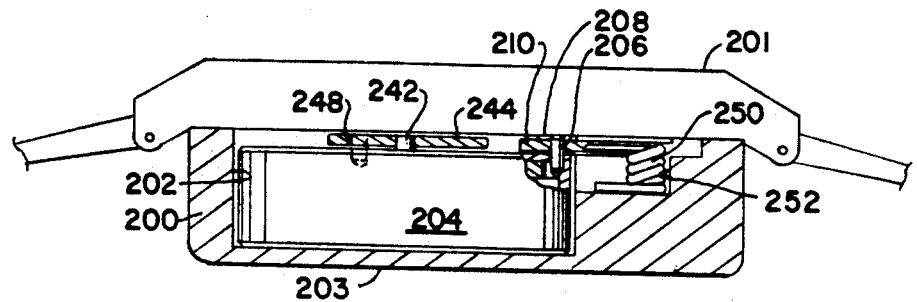
FIG. 15 is a longitudinal view, partially in cross-section, taken of a still further embodiment of the invention.

FIG. 14 shows another embodiment which imparts a tactile stimulus through the back of the alarm housing. The same form of timepiece, watch case, motor and motor housing as shown in FIGS. 11-13 may be employed, together with the gear train 114. However, a different form of rotating plate 180 (FIG. 14) is employed as the driven element of the gear train. The plate 180 has inner gear teeth 182 on its internal diameter. Smaller protrusions 184 may be used on the plate 180, as compared to the larger protrusions 122 on plate 118 of FIG. 11. These protrusions 184 may, alternatively if desired, be provided by one or more captivated balls. The back cover 186 for the housing may be formed as a single molded piece of the various thicknesses shown, which may be bonded, and/or screw fastened to the housing 105. The back cover 186 comprises a toroidal thicker outer section 188 which circumscribes a thinner inner section 196. Interspersed in the section 196 are one or more nodules 194, which may be spherical, or which alternatively may be formed as captivated balls. The area surrounding each nodule 194 which interconnects the nodule to the section 196 is made flexible by means of a living hinge or convoluted flexure membrane 192. The rotating plate 180 is retained against unwanted rocking or axial movement by a bearing plate 116 on the motor side, and by an overhanging section 190 of the toroid 188 on the side away from the motor. In operation, the physiological sensation produced by this embodiment is a tapping sensation which may be supplemented by a tugging of the watch band, due to the rocking motion resulting from the circumferential motion of the protrusions 184.

Figure 16:
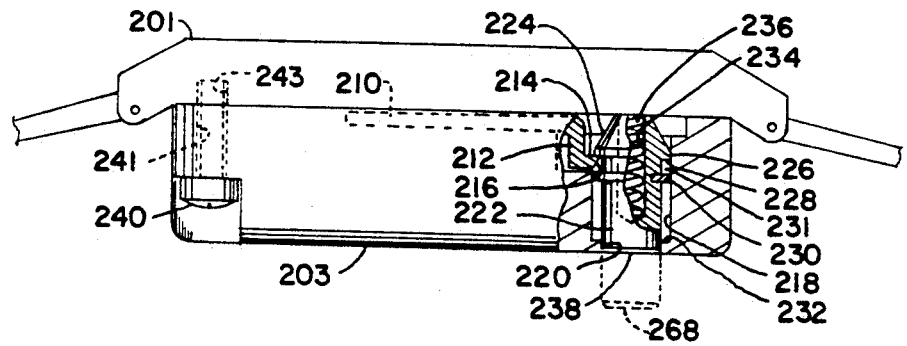
FIG. 16 is another longitudinal view, partially in cross-section, taken of the embodiment shown in FIG. 15, illustrating a plunger arrangement for tapping the wearer's wrist.
Figure 17:
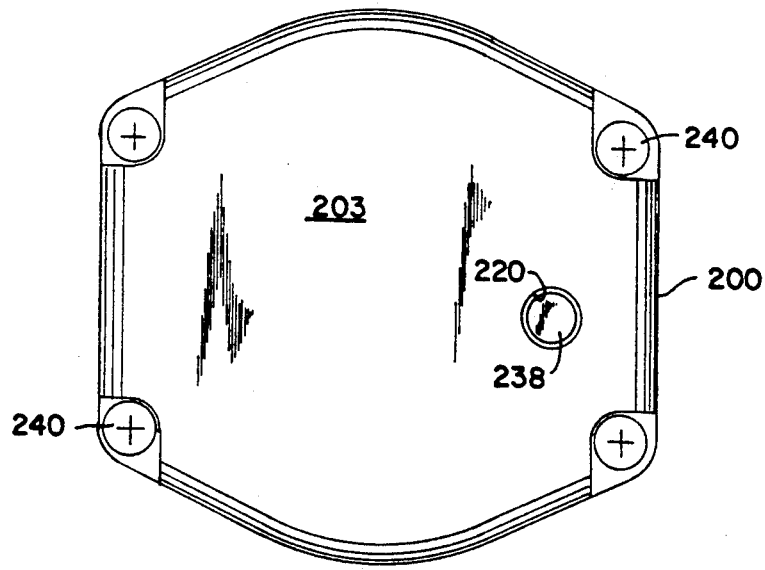
FIG. 17 is a bottom view of the embodiment of the invention shown in FIGS. 15-16.

A further embodiment of the invention is shown in FIGS. 15-19 wherein the tactile alarm stimulus is a single sharp blow imparted to the skin of the wearer. This is accomplished by means of a restrained plunger which is spring-biased towards the skin of the wearer and released at the set alarm time. As in the prior embodiments, the silent alarm mechanism housing 200 is mounted to a watch case 201 by means of screws 240 which pass through unthreaded holes 241 in housing 200 and are screwed into tapped holes 243 in watch case 201. A cavity 202 is provided in housing 200 to receive the motor 204. As seen in FIG. 16, the bottom surface 203 of the housing 200 is provided with the opening 220 through which a plunger 222 moves at the alarm time to apply its bottom surface 238 as the tactile stimulus to the wearer.

The motor is locked into position in the bore 202 by means of a set screw 205 (FIG. 19), as in the previous embodiments. A pin or shaft 206, having a headed end 208, is pressed into a hole in the top of the motor housing 200 in order to capture and provide a rotatable mounting for a detention lever or sear 210. A pair of recesses 260 and 262 in the housing 200 permit rotational motion of the lever to take place, as described more fully hereafter.

As seen in FIG. 16, the lever 210 has a depending arm 212 with an L-shaped extension 214. The inner surface of extension 214 is angled at 216, preferably at the same angle as the tapered surface 224 of the plunger 222. A through bore 218 is provided in the housing 200, which is reduced in diameter at the opening 220 to provide a landing surface 232 on an internal flange interconnecting the bores 220 and 218. The tapered surface 224 of the plunger 222 terminates in a flange 226 which serves as a sliding surface contacting the bore 218. The undersurface 228 of flange 226 serves as a mating surface for the latch extension arm 214. A seal ring 230 is provided on the central portion of the plunger 222 in order to serve as a second guide for reciprocation within the bore 218, to serve as a waterproofing seal and also to serve as a limit stop for the plunger when it contacts the surface 232 at the lower end of the path of movement of the plunger 222. The flange 226 and seal ring 230 define therebetween a circumferential groove 231 which serves to accommodate the latch extension arm 214.

Figure 18:
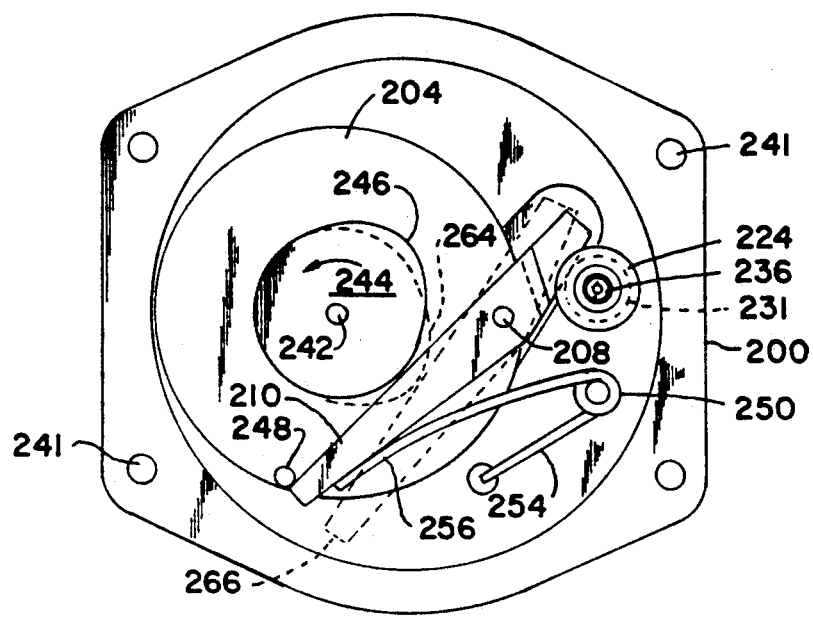
FIG. 18 is a plan view of the alarm housing with the watch removed to reveal the mechanism for actuating the plunger in the embodiment of FIGS. 15-17.
Figure 19:
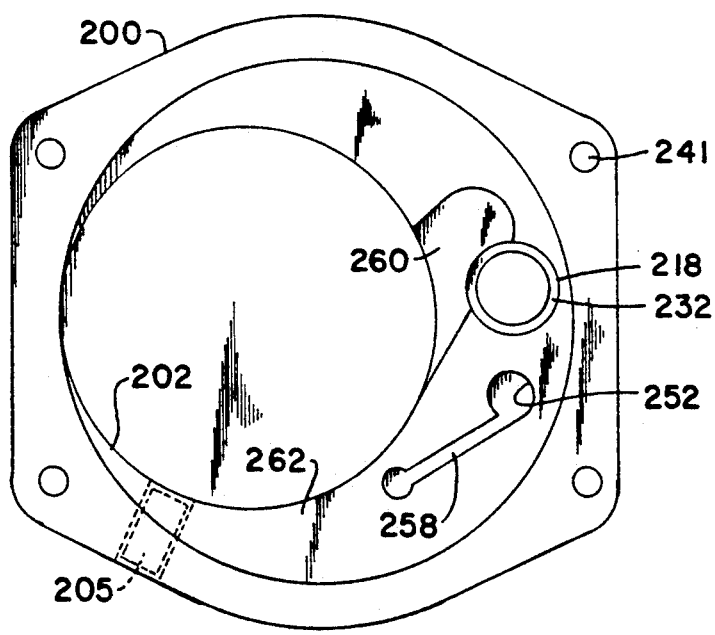
FIG. 19 is a plan view similar to FIG. 18 but with all of the internal elements removed to illustrate the various recesses in the alarm housing.

A spring 236 is provided in order to bias the plunger 222. The spring 236 is placed within a blind bore 234 in the upper part of the plunger. In normal position the upper part of the spring 236 will bear against the watch case 201 and thrust the plunger downward as viewed in FIG. 16. The spring is compressed by manually pushing the plunger 222 inward into the housing 200 where it is automatically retained in the inner position by the lever or sear 210 entering the groove 231. The latch extension 214 forms a retention surface to allow the latching surface 228 to rest on it. This motion of the lever 210 is accommodated within the recess 260 in the housing. The lever is normally urged into the latching position by the torsion spring 250. The coiled portion of the spring 250 is contained within a blind bore 252 (see FIG. 15) in the housing 200. The spring is provided with a fixed leg 254 and an operating or movable leg 256. The fixed leg rests within a recess 258 in the housing 200 so that it is restrained from motion. The operating leg 256 moves within the recess 262 in housing 200 which is at a level approximately coplanar with the top of the motor housing 204. A stop or limit pin 248 is provided in the top of the motor housing to serve as the limit or rest position when the lever 210 is in the latching position. The solid line position of the lever 210 shown in FIG. 18 is the normal latching position.

The motor shaft 242 has a cam plate 244 permanently mounted or press fitted to it. The cam plate is provided with a rise or camming surface 246 which, when rotated, is periodically caused to move the lever 210 against the action of the torsion spring movable leg 256. The solid line position of the cam plate 244 shown in FIG. 18 provides the maximum angle of unrestricted angular travel of the camming surface 246 before impacting the lever 210 to cause the movement of the lever 210 and the release of the plunger 222. The motor 204 may be fitted with a magnetic detent to assure that it always stops so that the cam plate is in the park position shown by solid lines in FIG. 18. This may be accomplished by providing a magnetic detent in the form of two small magnets, one fixed to the rotor and one to the housing of the motor 204, such that when the two magnets are juxtaposed to one another the motor stops at that position.

Also, the small clearance space appearing between lever 210 and the base circle of cam plate 244 serves to avoid drag while the cam plate 244 accelerates to the time when the camming surface 246 is placed in camming position. The dotted line position 264 of the cam is the position in which the cam is placed when the set alarm time is reached. The lever is then moved to assume the position indicated by the dotted line 266. In the latter position the latch extension 214 is withdrawn from groove 231 and the plunger 222 is allowed to be thrust downwardly as viewed in Fig 16 to assume the dotted line position 268 where it contacts and slightly indents the skin of the wearer.

To set the alarm the wearer selects an alarm time and sets the timepiece in the usual way. He then pushes the plunger 222 in towards the watch case 201 as far as possible, thus compressing the spring 236. This action causes the tapered surface 224 to pivot the lever 210 about its mounting pin 206 against the opposing force of the movable leg 256 of spring 250. The limit of inward movement would be reached if the plunger 222 strikes the underside of the watch case. However, just prior to this position being reached the circumferential groove 231 becomes aligned with the lever 210, and since the groove may be made slightly wider than the thickness of the lever, the spring leg 256 will serve to drive the latch extension 214 into the groove and into the latching position. Continued pushing on plunger 222 will not move it inward any further.

At the designated alarm time the motor 204 is caused to rotate for a relatively brief time, e.g. 50 milliseconds, by electronic circuitry substantially identical to that shown in FIG. 10, to cause rotation of the cam plate 244. The cam plate rotates until the rise surface 246 contacts the lever 210 as previously described, to cause the lever to rotate to the dotted line position 266 at which position the lever 210 is no longer within the groove 231 and the latch extension 214 is released from retaining plunger 222 in retracted position. At that time the compressed spring 236 acts to drive the plunger 222 forcefully toward the wearer. The plunger 222 continues to accelerate toward the wearer until it is arrested by the skin of the wearer or by limit stop 230 reaching the shoulder 232.

Figure 20:
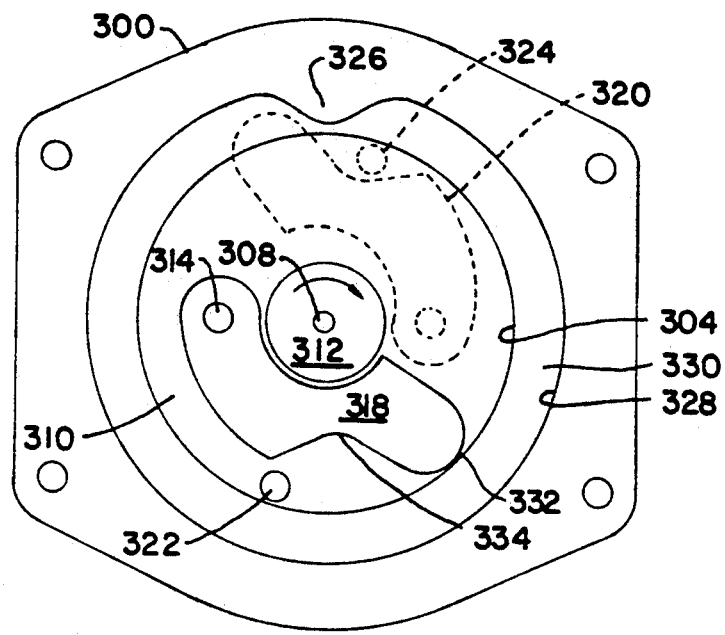
FIG. 20 is a plan view similar to FIG. 18 but of a further embodiment of the invention employing centrifugally driven arms to deliver side blows to the alarm housing.
Figure 21:
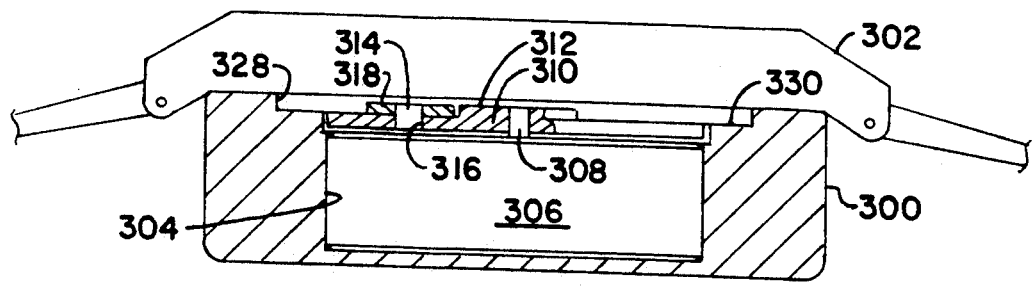
FIG. 21 is a longitudinal view, partially in cross-section, of the embodiment shown in FIG. 20.

A still further embodiment is shown in FIGS. 20 and 21 which utilizes one or more centrifugal weights. A single such weight 318 is shown in FIG. 20, although a second weight such as 320 (shown in dotted line) or additional weights may be used. The purpose of such weights is to deliver a tactile stimulus in the form of a "jackhammer" type side blow to the alarm housing 300 (FIG. 21) which is mounted on the back of the timepiece 302. As shown in FIG. 21 the housing 300 is provided with the bore 304 to accommodate a motor 306 which has the output shaft 308. A plate 310 is affixed at its central hub 312 to the shaft 308 to rotate therewith. Plate 310 carries a pin, such as 314, affixed to it within a hole 316. Centrifugal weight 318 has a shape typically as shown in FIG. 21 and it is able to rotate about the pin 314. A stop pin 322 is mounted on plate 310 to provide a detent position beyond which weight 318 may not move. The weight 318 is thus prevented from pivoting outward far enough to contact the recess wall 328 constantly. Such contact is not desirable since it would slow motor 306 down in the manner of a flyball governor and expend electrical energy needlessly. Housing 300 is provided with a recess 330 to accommodate the movement of centrifugal weight 318. A wall portion 328 is thus formed juxtaposed to the surface 332 of the weight 318. The wall 328 is provided with an abutment 326. Surface 332 serves as an impact surface on weight 318 for contact with the abutment 326. The surface 334 is a relieved surface on the weight against which the stop pin 322 may impact.

At the designated alarm time the motor 306 commences to run and rotates the shaft 308 to pivot the weight 318 centrifugally about pin 314. The mass is such that a single rotation of shaft 308 is sufficient to throw weight 318 against the stop pin 322, where it remains until the weight 318 strikes the abutment 326. After this impact weight 318 is cammed inward by the abutment 326 and the motor 306 momentarily slows down due to the energy expended in the impact. As the motor continues to run, rotation of the shaft 308 causes impacts of weight 318 against the abutment 326, which serves as the tactile stimulus to the wearer. If only a single weight is used the wearer also experiences an imbalance induced vibratory sensation. Where a balanced symmetrically disposed additional weight 320 is used only a steady series of blows will be delivered.

Although what has been described are preferred embodiments illustrating a means for carrying out the invention, it is clear that various modifications may be made while still providing a device which comes within the spirit and scope of the invention. For example, the motor may be made to operate a variety of other modes of alerting the wearer by tactile means or by a combination of tactile, audile, mobile and other means. Alternative motive means may be used. The gear train shown in the embodiments of FIGS. 11-14 can take the form of friction rollers, pulleys, miniature timing belts or other means of achieving reduction ratios.

What is claimed is:

1. An alarm timepiece capable of being worn on a person's wrist which comprises, in combination:
   an electrically operated timekeeper comprising (1) an electrically-operated time-keeping means including visual time display means and a watch circuit for keeping time and operating said time display means, said watch circuit including means for generating an electrical alarm signal at pre-selected times, and (2) a watch casing containing said timekeeping means; and
   a tactile alarm mechanism attached to said timepiece so as to be in physical contact with the wrist of a person wearing said timepiece, said tactile alarm mechanism comprising a housing attached to said casing, an electric motor mounted within said housing, a tactile stimulus generating means carried by said housing operable to generate a tactile stimulus, means in said housing coupling said tactile stimulus generating means to said electric motor so that operation of said motor will cause operation of said tactile stimulus generating means, and a motor operating circuit carried by said housing, said motor operating circuit being connected to said watch circuit and having means for turning said motor on and off in response to said electrical alarm signal, whereby a tactile stimulus is generated and transmitted to said person each time said electrical alarm signal is generated, said tactile stimulus generating means comprising a plunger movably mounted in said housing, spring means biasing said plunger towards the skin of the person wearing the timepiece, latch means restraining said plunger against movement toward the skin of said person, and means actuatable in response to operation of said motor for releasing said latch means, whereby said spring means acts to thrust said plunger against the skin of the person wearing the timepiece.

2. The timepiece of claim 1 wherein said time-keeping means includes means for generating an audible alarm in response to said electrical alarm signal.

3. The timepiece of claim 1 wherein said tactile stimulus generating means is adapted to deliver the tactile stimulus by thrusting said plunger through a hole in a portion of said housing bearing against the skin of said person's wrist.

4. The timepiece of claim 1 further including a battery mounted within said casing for providing power to operate said time-keeping means, and further wherein said battery is connected by said watch circuit to said motor operating circuit, whereby when said motor is turned on by said motor operating circuit, power is supplied to said motor at substantially the full voltage of said battery.

5. An alarm timepiece capable of being worn on a limb of a person which comprises:
   a watch including an electrically operated time display means, a watch circuit operative to keep time and operate said time display means, means associated with said watch circuit for setting a preselected alarm time, an electrical power source coupled to said watch circuit for operating said watch, means coupled to said watch circuit for generating an alarm signal at said alarm time, and a watch casing containing all of said foregoing means, said watch casing having a front side and a back side with said time display means disposed so as to provide a time display at the front side of said casing;
   a discrete alarm mechanism including an electric motor, a tactile stimulus generating means for applying a tactile stimulus to the limb of a person wearing the timepiece, a motor operating circuit, and a housing containing said motor, said tactile stimulus generating means and said motor operating circuit, said housing being attached to said back side of said watch casing; and
   means for removably fastening the timepiece to a limb of a person so that said housing will bear against said limb;
   said motor operating circuit being connected to said watch circuit so as to receive said alarm signal and having means responsive to said alarm signal for applying power from said power source to said motor so as to operate said motor and actuate said tactile stimulus generating means;
   said tactile stimulus generating means comprising a plunger aligned with a hole in a rear surface of said housing, a spring urging said plunger to thrust through said hole, latch means holding said plunger in retracted position, and means actuatable by operation of said motor to release said latch means so as to permit said spring to thrust said plunger through said hole against said limb, whereby when said timepiece is fastened to a person's limb with said housing bearing against said limb and said alarm signal is generated, said motor will operate to release said latch means so as to allow said spring to thrust said plunger through said hole against said limb and thereby transmit a tactile stimulus to said limb.

6. An alarm watch adapted to be worn on a limb of a person, said watch comprising a watch circuit including time display means and means for providing an alarm signal in the form of a train of pulses at a preselected alarm time, a battery coupled to and providing electrical power to said circuit, and a watch casing containing said circuit and said battery;
   said watch being further characterized by a tactile alarm mechanism mounted to said casing and comprising an electric motor, a tactile stimulus generating means, means coupling said tactile stimulus generating means to said motor so that said tactile stimulus generating means will be operated by said motor when said motor is energized, and a motor operating circuit coupled to said watch circuit, said motor operating circuit being adapted to respond to said train of pulses by producing a motor drive signal at the full voltage of said battery and apply said drive signal to said motor so as to energize said motor in response to said train of pulses;
   said motor operating circuit including a pair of FET's connected in series, the first being a P-channel FET which is turned on by said pulse train and brought to ground potential, the second being an N-channel FET which is turned on when said P-channel FET reaches ground, thereupon providing said motor drive signal.

7. The watch of claim 6 wherein said motor control circuit has means to provide an intensifier signal to said display means to insure its visibility at such time that said motor operates.

8. The watch of claim 6 wherein the output of said second FET is controlled by a charging couple circuit that permits said second FET to remain on for a selected time after the first mentioned FET is turned off.

9. The watch of claim 6 further including a housing releasably attached to said watch casing and containing said motor and said tactile alarm mechanism.

* * * * *